United States Patent [19]

Parker et al.

[11] Patent Number: 5,672,277

[45] Date of Patent: Sep. 30, 1997

[54] EXTRACTION OF WATER FROM OIL

[75] Inventors: Steven C. Parker, Mission Viejo; Robert M. Culbert, Manhattan Beach, both of Calif.

[73] Assignee: Hydra-Tech Hydraulics, Inc., Carson, Calif.

[21] Appl. No.: 107,859

[22] PCT Filed: Apr. 24, 1992

[86] PCT No.: PCT/US92/03428

§ 371 Date: Oct. 17, 1994

§ 102(e) Date: Oct. 17, 1994

[87] PCT Pub. No.: WO93/22025

PCT Pub. Date: Nov. 11, 1993

[51] Int. Cl.$^6$ .................................................. B01D 15/00
[52] U.S. Cl. ........................ 210/689; 210/484; 264/160
[58] Field of Search ................................. 210/679, 689, 210/470, 471, 483, 484, 495, 497.01, 502.1; 264/160

[56] References Cited

U.S. PATENT DOCUMENTS

| | | | |
|---|---|---|---|
| 3,528,547 | 9/1970 | Adams et al. | 210/96 |
| 4,242,206 | 12/1980 | Estabrooke | 210/489 |
| 4,539,107 | 9/1985 | Ayers | 210/96.1 |
| 4,747,960 | 5/1988 | Freeman et al. | 210/689 |
| 4,758,350 | 7/1988 | Pitts et al. | 210/679 |
| 4,787,949 | 11/1988 | Cole et al. | 210/689 |

OTHER PUBLICATIONS

Soviet Inventions Illustrated; Derwent Publications Ltd.; 15 Feb. 1984; 98–004150; Nemtsov, N.S.

*Primary Examiner*—Ivars Cintins
*Attorney, Agent, or Firm*—Christie, Parker & Hale, LLP

[57] ABSTRACT

A bag type device (2) for extracting water from oil includes a bag (3) with an outer layer of felt (20) lined by at least one layer (22) of water absorbing laminate. The interior of the bag is composed of a plurality of slit sheets of water absorbing laminate forming a plurality of finger-like strips (35) depending from adjacent the top of the bag. The strips are preferably longer than the length of the bag. The bag and the water-absorbing layers within the bag are supported by a wire ring (30) stitched into a hem around the open upper end of the bag. As oil is passed through the bag, the finger-like strips provide an increased surface area for absorption of water from the oil. The strips can expand inwardly and toward the oil flow to prevent back-pressure build up within the bag.

23 Claims, 5 Drawing Sheets

EXTRACTION OF WATER FROM OIL

FIELD OF THE INVENTION

The invention relates generally to a filter, and more specifically, to a bag-type water absorbing element for extracting water from oil.

BACKGROUND OF THE INVENTION

A machine requires, oil to lubricate the various moving parts within the machine. Without proper lubrication, the machine may not perform properly and may prematurely wear. This can lead to a shorter life span for the machine and increased maintenance costs. When a foreign fluid, such as water, enters the oil, the lubricity and other properties of the oil may be detrimentally affected. Manufacturers may not warrant a machine if too much residual water is present in the lubricating oil. It is, therefore, important to keep the machine properly lubricated with oil which is free of or contains only very low levels of water.

It is not always possible, however, to keep the oil dry. Machines, such as can seamers used in the brewing and canning industries, are routinely hosed down and steam-cleaned. These machines are also often subjected to changing temperatures which can cause moisture to accumulate on or within the machine. Water may leak into the interior components of the machine and enter the oil supply.

In addition to adversely affecting the lubricity of the oil, as little as 1% residual water in the oil may cause several other problems. Even within an oil environment, water can lead to rust which severely impairs precision parts such as gear mechanisms and bearings. Moreover, the water may lead to hydrogen embrittlement of metal which causes metal particulates to break away and cracks to form. The particulates may act as abrasive grains in the machine and limit its performance. Furthermore, water molecules dan enter the cracks and form additional rust centers within parts of the machine.

When specialized types of oil compounds having anti-wear and other additives are used to lubricate the machine, water dispersed in the oil can react with the zinc, e.g., used in many of such oils. The product of this reaction is a metal soap which can clog valves and other precision machine components. Furthermore, the water oxidizes the antifoam and stabilizer packages present in the oil which may reduce the viscosity of the oil, and lead to friction wear between adjacent moving parts.

Due to the detrimental effects described, the lubricated machines will have to be serviced more frequently, leading to undue system shutdown events and increased costs. Many of these effects can be prevented by providing a system for extracting dispersed water from the lubricating oil.

Various devices and methods have been proposed and employed to extract water from oil, but each suffers from distinct disadvantages. One approach is to use a water absorbing material suspended in a fiberglass mat in a pleated format much like an automobile air or oil filter. The fiberglass mat is laminated in a construction in which the fiberglass is spun-bonded between a propylene-base paper-like sheet and filter paper.

This filter suffers from a large size, low water extraction capacity, and inability to extract water from oils which retain water as a very fine dispersion of water in oil. Also, as the oil viscosity increases, the performance of this type of filter drastically decreases. If a water disperser is present in the oil, as is the case with many high quality oils, this filter can only achieve an often-unacceptable 1% residual water level in the oil. Due to its low capacity, the filter must be replaced frequently, leading to overall system shutdown and increased maintenance costs. Due to the large size of the filter, a large amount of usable oil is removed from the oil circulation system when the filter is replaced. This oil must either be replaced or drip drained back into the machine. Each choice is time consuming and potentially costly. Costs are especially great for replacing used filters because used oil is classified as a toxic substance which must be disposed of in a specified and costly manner.

Recently, bag-type water extractors have been introduced to provide an alternative to the fiberglass laminate filters. These bag-type filters have a bag-shaped exterior and several continuous layers of water absorbing laminate in the form of a secondary inner bag lining the principal bag. Wet oil is passed through an opening at the top of the bag and through the lining which extracts the water from the oil. Although this type of filter is smaller than the pleated fiberglass filter and takes a substantially lower amount of usable oil from the system when the filter is replaced, the bag suffers from an easy flow path for the oil to pass directly to the bottom of the bag. The lining on the sides of the bag can be bypassed. If an increased amount of water absorbing material is used within the bag, the bag suffers from an unacceptable back pressure which may strain the recirculating pump which moves oil from the machine through the extractor. That back pressure is produced because the water absorbing material swells and expands as it absorbs water from the oil, and that expansion closes off the passages in the filter through which the oil must flow to exit from the filter.

In light of the foregoing, a need exists for an improved filter element for extracting dispersed water from oil and other non-aqueous liquids and in which the element has one or more of the following characteristics: low retained oil volume, high water sorption capacity, useful with high viscosity liquids, useful in existing water-removal liquid handling systems, does not manifest high back pressure before replacement of the element is timely in terms of sorption capacity or sorption efficiency, compatible with additives in high-performance lubricants, produces low residual water levels in the filtrate, and cost effective in comparison to existing water extraction devices.

SUMMARY OF THE INVENTION

This invention addresses the need identified above. It does so by providing a structurally simple and readily made bag-type filter element which efficiently and effectively removes dispersed water from oil, e.g.

Generally, the present invention provides a bag-type water extraction element including a bag having a closed bottom and an open top, a bag support near the top of the bag, and at least one layer of water sorbing material essentially fully covering the inner surface of the bag. The water sorbing material is provided in the form of a plurality of filaments which depend into the bag from adjacent the bag top.

To facilitate the needs of users, the diameter and length of the bag can be varied to allow the bag to fit various containers. The filaments of water sorbing material produce a low volume, high capacity extractor element which does not have to be frequently replaced. These desirable characteristics are retained even in the presence of viscous, high-grade oils.

As used herein, the term sorption includes both absorption, in which water is taken into and retained in the sorption medium, and adsorption in which water molecules and droplets are held on the surface of the sorption medium.

BRIEF DESCRIPTION OF THE DRAWINGS

The above-mentioned and other features of the present invention are more fully set forth in the following description of the presently preferred and other embodiments of a bag-type water extractor, which description is presented with reference to the accompanying drawings in which.

DETAILED DESCRIPTION OF THE INVENTION

Figure 1:
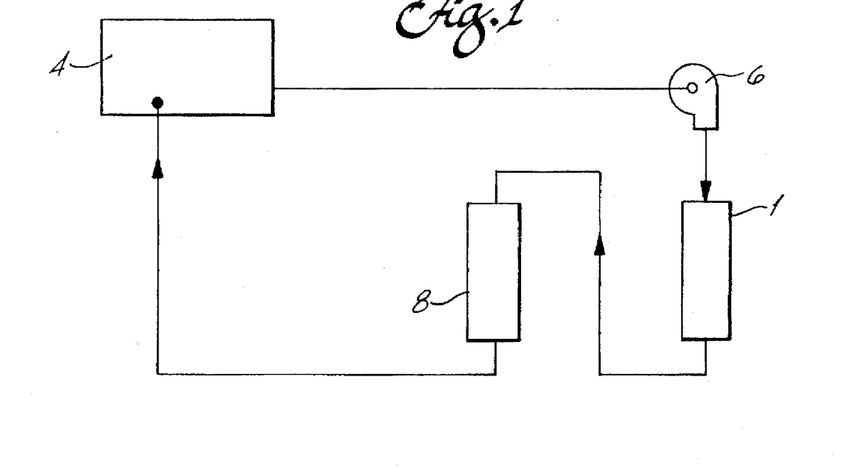
FIG. 1 is a schematic diagram of a lubricating oil recirculating system for a machine.

Referring to FIG. 1, an oil recirculating system for removing water and particulates from lubricating oil includes a lubricated machine 4 from which oil is pumped through a suitable pump 6. The machine may be a can seamer, for example, commonly used in the brewing industry or any other machine requiring substantially water-free oil for effective lubrication of the machine. The pump circulates the oil from the machine into a water extraction unit 1 which removes at least some of the water from the oil. Downstream from the extractor, a filter 8 removes particulates from the oil. After numerous circulations through the system, the oil becomes essentially dry and particle-free, and is reused in the machine.

The water which is present in the oil in machine 4 commonly is in a colloidal dispersion in the oil. The water is immiscible in the oil, and so is present in the oil as very fine droplets, perhaps even molecules, which are suspended in the oil.

Figure 2:
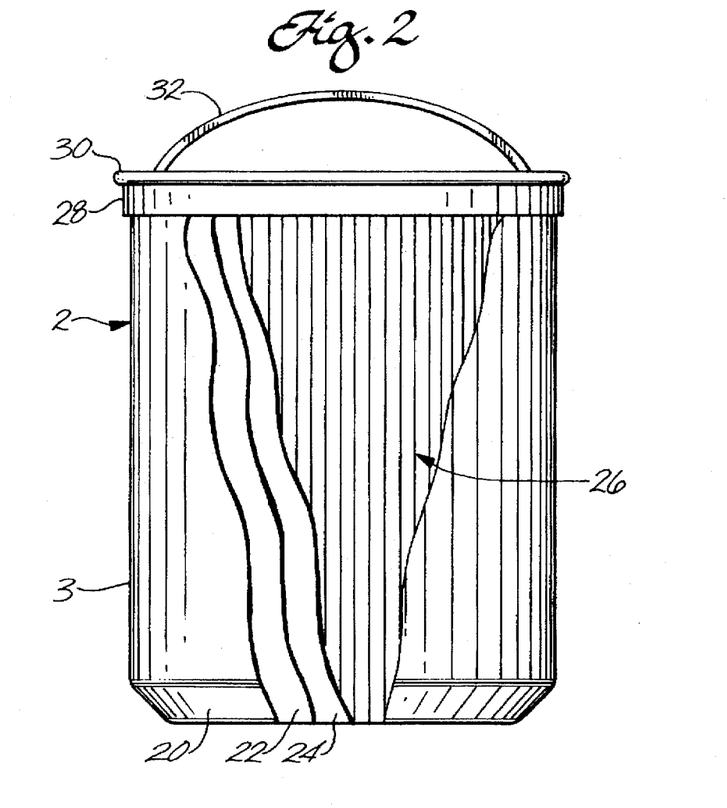
FIG. 2 is an elevation view, partially in cross-section, of an extractor according to the present invention.

Referring to FIG. 2, a water extractor 2 according to the present invention preferably includes a bag 3 having a closed bottom and an open top. The bag is preferably formed of a back-up fabric which, in a presently preferred extractor, is 50 micron needled felt 20. The interior of the bag is lined with two unslit layers 22, 24 of high loft water sorbing material. One or more layers of high loft water sorbing filament 26, made of the same water sorbing material as the bag liner, are contained within the bag. The water sorbing material is preferably a superabsorbing polyacrylate polymer formed into a laminated sheet material such as Gelok 9503, a product of Gelok International Corp. of Dunbridge, Ohio. The presently preferred polymer is polymer IM-1000 obtainable from Hoechst/Celanese Corp. A bag support ring 30 (see FIG. 3), preferably formed of wire, proximate the top of the bag serves as a support for the extractor during use of the extractor. Each of the layers of water sorbing filament 26 in the bag depend from adjacent the wire ring in a way broadly reminiscent of a hula skirt. The wire ring is enclosed in a hem formed by a strip of bias canvas 28 which is folded over the wire ring and stitched to each of the layers of the bag. A fabric strip handle 32 is stitched to the bias canvas for convenient handling of the extractor.

Figure 3:
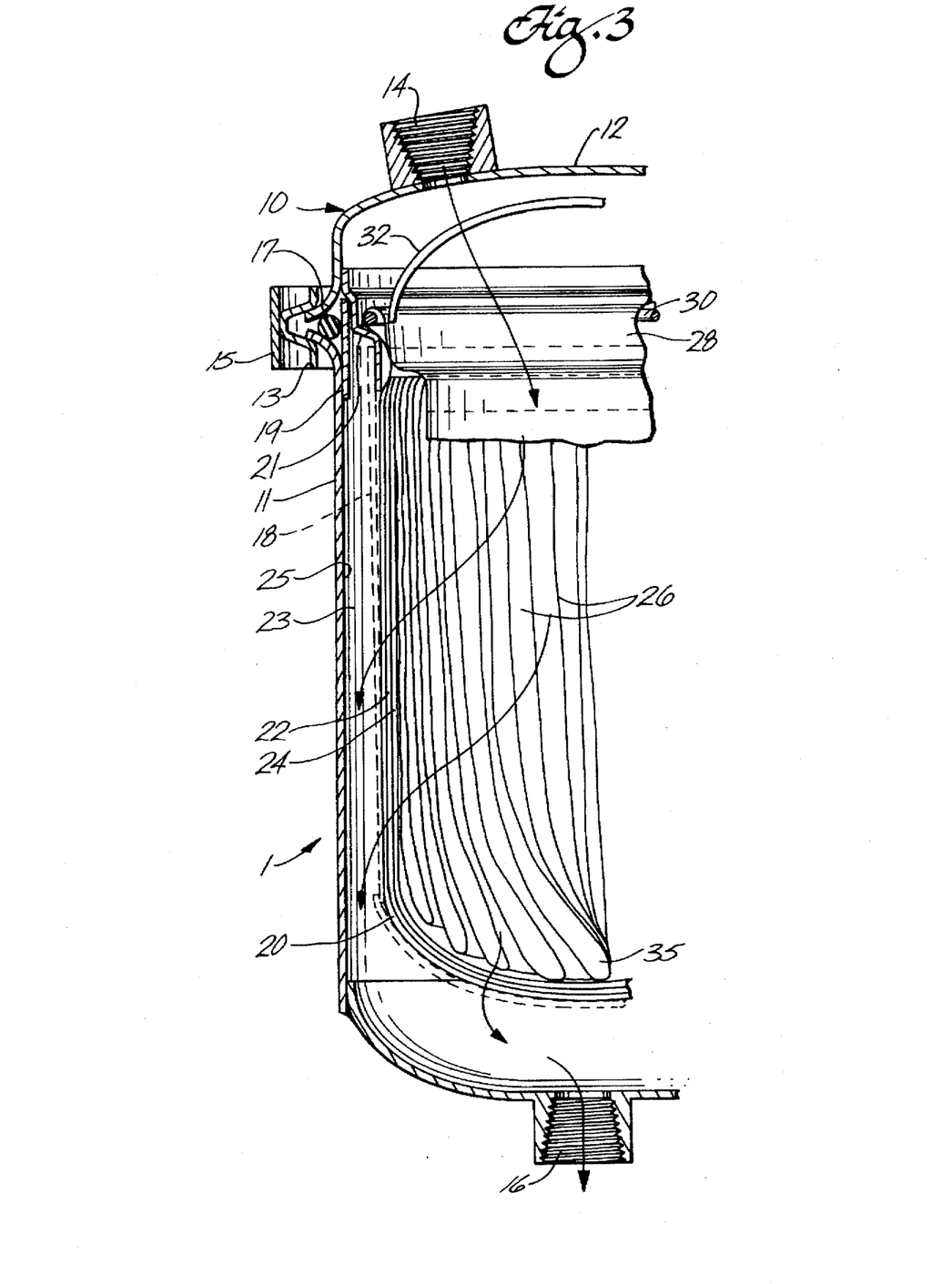
FIG. 3 is a cross-sectional elevation view of a portion of the extractor and of a canister assembly for housing the extractor.

Referring to FIG. 3, the extractor 2 is mounted within a conventional canister assembly 10 commonly used to house bag-type absorber elements used in lubricating oil recirculating systems, e.g.. The container assembly includes a tank-like hollow container body 11 for holding the extractor. The wire support ring 30 of the extractor rests upon an upward facing ledge 21 within the container body. The diameter of wire ring 30 is sized to conform to conventional sizing standards for filter canisters and fits conveniently on the ledge above a perforated metal basket 18 which depends from the ledge within canister body 11. An annular side channel 23 is formed between the basket and an inner wall 25 of the container body to allow oil to flow outwardly of the basket. A removable lid 12 is held lightly on the body 11 via a clam shell cover clamp 13 which is composed of a pair of essentially c-shaped members 15 which are hinged together (not shown) at one pair of adjacent ends and which are capable of being drawn together over the lid and body rims by a conventional over-center toggle clamp mechanism (not shown) engaged between the unhinged ends of the members. An O-ring 17 is lodged between the container lid and body. The O-ring prevents leakage from the closed canister of oil which is pumped at a selected pressure through the water extraction assembly.

Recirculating oil enters the container assembly through an oil inlet 14 in the container lid 12. As oil passes through the bag-type extractor, the water dispersed within the oil is absorbed by the filaments 26 of sorbing material within the bag. The filaments are composed of finger-like strips 35 which expand substantially inwardly of basket 18 as they absorb water from oil flowing through the extractor. After passing through the absorber filament array, the oil then passes through the unslit layers 22 of sorbing material and the felt 20 which forms the outer portions of the extractor. The oil then passes out of the extractor to the side channels 23 outside the perforated basket, and through the bottom of the basket. The oil then passes out of the canister assembly through oil outlet 16. The oil is then circulated to the particulate filter 8 (FIG. 1) where particulates are extracted from the oil.

As the oil passes through the unslit layers 22, 24 of water sorbing material, some of the water dispersed in the oil is taken up by those layers, which then expand. Those layers, however, define a liner in the outer felt bag and are forced, with the felt bag itself, by the oil pressure in the bag against the inner surfaces of the perforated basket which confines the bag. Expansion of sorption layers 22, 24, as they remove water from the oil flowing through them, gradually constricts the liquid flow pores in those layers, thereby increasing the resistance of the extractor to the flow of oil through it. That flow resistance increase causes the back pressure in the extractor (i.e., the pressure drops across the extractor) to rise. The resulting pressure drop across the extractor can be readily monitored by pressure gages (not shown). When the extractor pressure drop increases, for example, from 20 psi to 25 psi, the extractor bag may need to be replaced.

Figure 4:
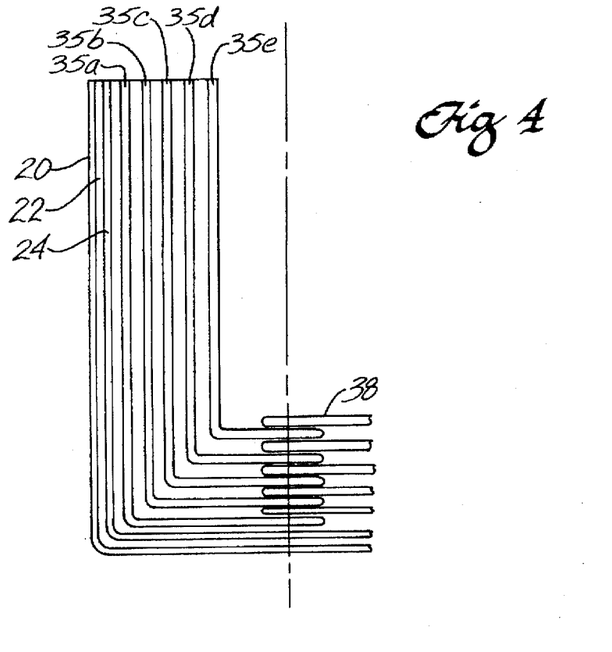
FIG. 4 is a simplified cross-sectional view of the extractor.

Referring to FIG. 4, the interior filaments 26 of the bag preferably are composed of five slit sheets of superabsorbing laminate 35a–35e. As described more fully below, each slit sheet of laminate material is folded once on itself so that, in the presently preferred extractor, there are ten layers of water sorbing filaments about the inner circumference of the extractor bag. The finger-like strips (filaments) formed by the slit layers of laminate preferably have a length about 25% longer than the length of the bag. This allows absorption of water to occur at the bottom of the bag as well as along the sides. The strips are preferably intermingled at their ends 38 in such a way that the oil passing through the bag has no straight flow path through the extractor. However, the strips are free to move within the bag.

Figure 5:
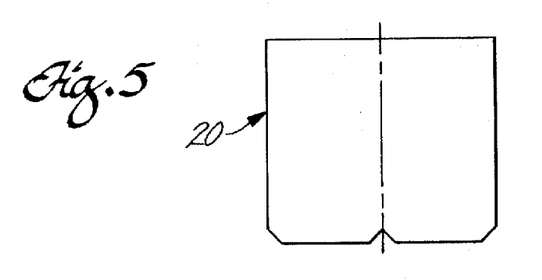
FIG. 5 is a plan view of the outer layer of the extractor ready for forming into finished form.
Figure 6:
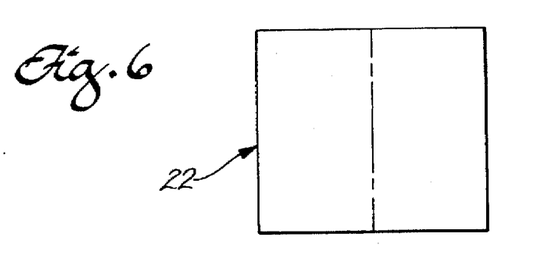
FIG. 6 is a plan view of a lining sheet used within the extractor ready for forming into finished form.

Referring to FIG. 5, the felt for bag 20 is cut according to the dimensions of the bag. The corners of the felt bag preferably are cut diagonally so the bag can fit snugly within the rounded perforated basket of the canister assembly. Referring to FIG. 6, each unslit sheet of water sorption material can be folded on itself to define the water sorbing liner (layers 22, 24) for the felt bag.

Figure 7:
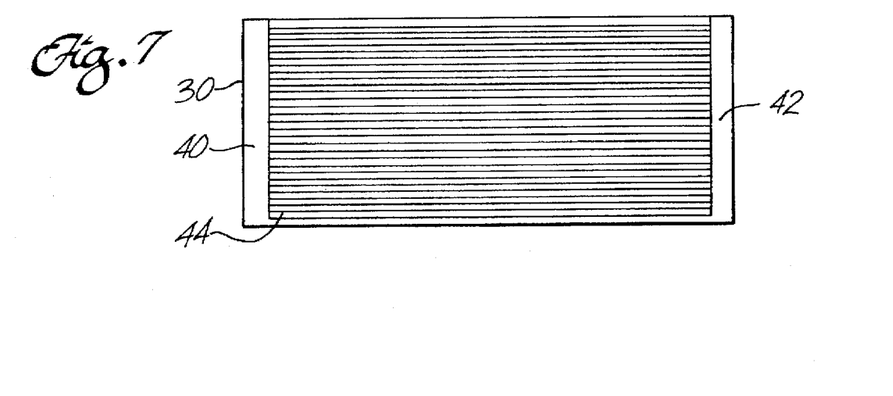
FIG. 7 is a plan view of a slit absorber sheet used as part of the interior filament assembly of the extractor.

Referring to FIG. 7, the inner slit layers of sorption material have parallel slits traversing the entire sheet of laminate except for two end margins 40, 42, one on each end of the sheet. The sheets are die cut by a rule die converter, for example, to form slits 44 preferably along the machine direction of the sheet. The ends of the slits are inwardly of the end margins 40, 42 of the sheet.

Figure 8:
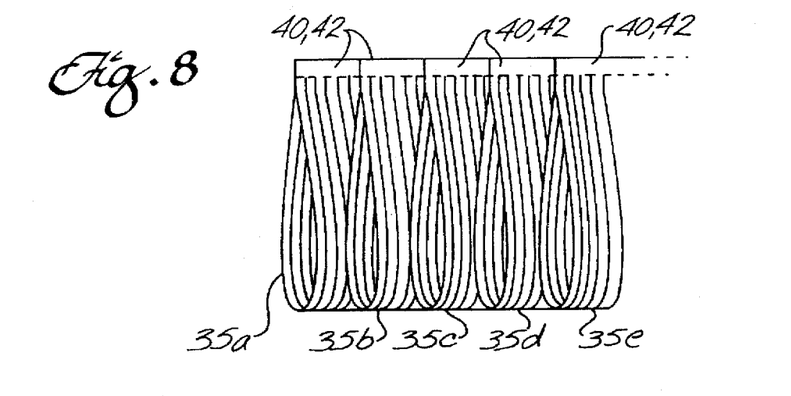
FIG. 8 is a perspective view of a subassembly of the sheets shown in FIG. 7.

Each slit sheet is then folded, as shown in FIG. 8, to cause the unslit end margins to register, thereby defining the equivalent of two smaller sheets slit from adjacent one end through the opposite end. This results in a stronger hula-skirt like configuration in the finished product. In a preferred embodiment, five sheets of water sorbing material are constructed in this manner.

The five separate folded sheets of slit superabsorber sheet are then stacked together, each adjacent slit sheet being offset from the neighboring sheet along the sheet end margins by an odd number of half widths of a strip formed between adjacent slits 44. In this way, the finger-like strips are free to intermingle and move between the strips of the adjacent sheet providing no straight flow path for the oil through the extractor. The five folded slit layers of water absorbing material preferably are stitched together along their registered end margins to produce a subassembly.

Figure 9:
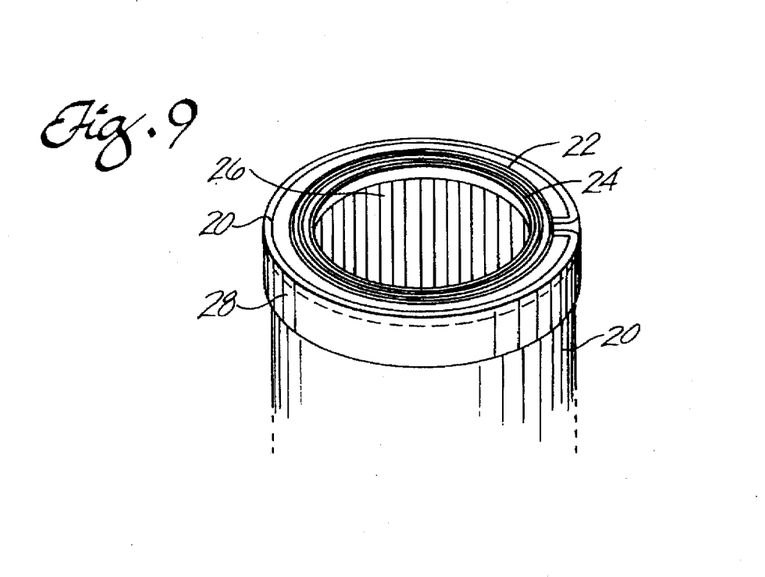
FIG. 9 is a perspective view of a portion of the extractor showing the several layers of the bag-type extractor.
Figure 10:
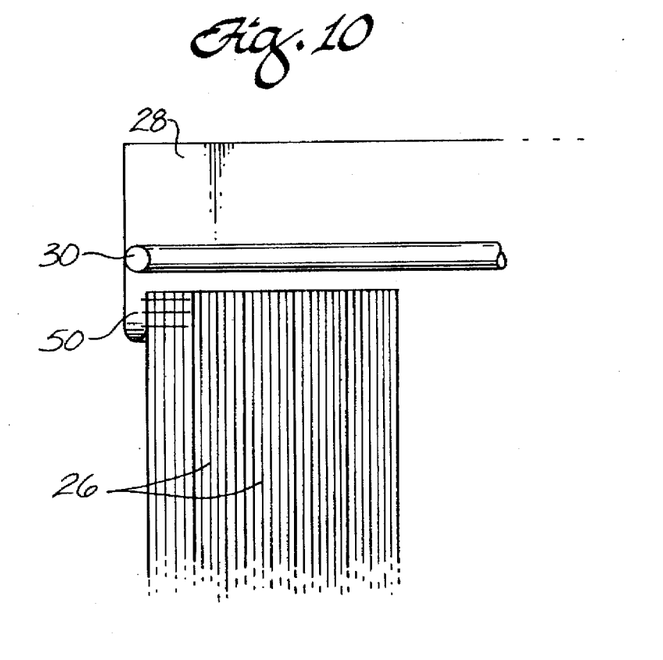
FIG. 10 is a cross-sectional elevation view of a portion of the extractor showing the wire ring and bias canvas for providing support for the bag.
Figure 11:
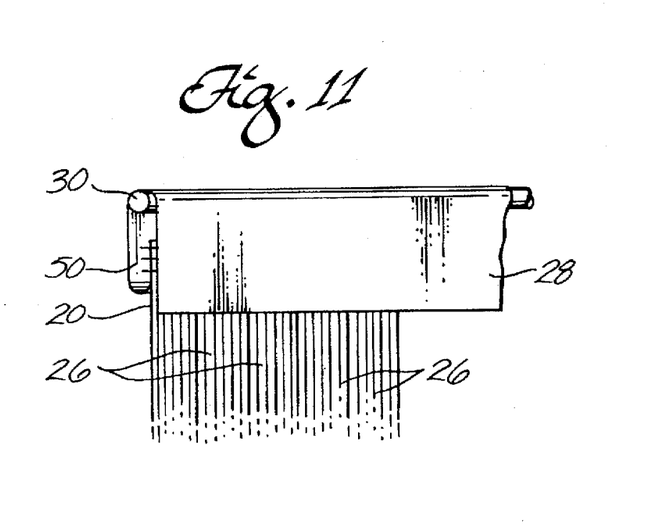
FIG. 11 is an elevation view showing the bias canvas folded over the wire ring to complete assembly of the support of FIG. 10.

Referring to FIG. 9, the bias collar material 28, made of canvas or the like, is stitched around the periphery of the felt 20 and the inner liner 22 and 24. The slit superabsorber subassembly (FIG. 8) is then rolled into a cylinder having a diameter substantially similar to the inner diameter of the bag and is inserted into the lined felt bag. That subassembly is then stitched in place. Referring to FIG. 10, the bias collar is then folded up and an appropriately sized wire ring 30 is inserted into the interior to the folded collar. Referring to FIG. 11, the collar is then folded inside the bag and the wire ring is secured by stitching the collar to entrap the ring in a hem. Additional stitching can be provided at the lower end of the collar to secure the several layers of the bag. Finally, the ends of the handle 32 are stitched to the collar beneath the wire ring.

The described presently preferred embodiment of the invention provides several advantages and addresses the needs described above. The filament-like strips of sorbing material within the extractor provide high water sorption capacity. As the oil flows through the bag, it follows a tortuous path through the finger-like strips of water sorbing material within the bag. The maze of strips provides a low flow resistance path. The length and circuitous nature of that path affords intimate contact between the water dispersed in the oil and the sorption medium. There is a high effective residence time of wet oil with the sorption medium per pass through the extractor. There is also a very high effective sorption surface area produced by the strips because both sides of the strips contact the oil.

The strips of sorption material are designed to be longer than the length of the bag. The lower ends of the strips cover the bottom of the supporting bag to prevent the oil from flowing preferentially through the bag bottom rather than through the sorption material which lines the bag sides. The intermingled ends of the strips also serve to maximize contact of the sorption medium with the water dispersed in the oil.

The unslit sorption material used as a lining in the outer support bag also provides several advantages. First, the unslit material provides additional sorption for the oil before it passes out of the bag. Second, using gauges already present on many oil recirculating systems, the extractor provides a convenient method by which users can determine when it is timely to replace the extractor bag with a fresh one. The amount of unslit sorption material used in the bag liner is selected relative to the quantity of filamented sorption material within the bag to provide a designed-in pressure drop across the extractor when a selected portion of the water sorption capacity of the sorption medium has been used. That portion can be 100%, but preferably is less than 100% and is a percentage which is empirically determined to correspond to the optimum time to replace the extractor. That optimum time can be determined in terms of a particular level of water extraction efficiency of the extractor, or it can be in terms of a specified residual level of water-in-oil exiting the extractor, for example. Furthermore, this pressure drop can readily be monitored by conventional pressure gauges at the inlet and outlet ends of the container in which the extractor is housed in use. If all of the sorption capacity of the extractor is provided by filaments of sorption material in the bag, the pressure drop across the extractor remains minimal throughout the sorbing life of the extractor. In that case, a user would have to separately analyze (such as by use of the ASTM xylene extraction and distillation method) the oil leaving the extractor for retained water content to know when the water sorption capacity of the extractor has been consumed in full or in such part as to warrant replacement of a spent extractor. On the other hand, if the sorption capacity of an extractor according to this invention were provided entirely in the form of unslit sorption medium along the inner walls of the bag, the extractor pressure drop would grow to high levels long before the sorption capacity is consumed, the extractor would have to be much larger, and the power of the oil circulation pump would have to be greater. The present extractor combines low pressure drop and high useful sorption capacity in a small device which is useful with oil circulating pumps of modest power rating.

The felt outer layer of the extractor bag also provides several advantages. The felt acts as a support bag to house the relatively less strong and fragile sorption material within the bag. As oil passes through the open end of the bag and through and around the filaments, pieces of sorption strip material may break off and flow with the oil. Also, the sorption medium, the super absorbing polymer, is present in granular form in the sorption material laminate. Granules of the polymer can separate from the laminate. The felt layer of the bag prevents these pieces of sorption material and particles of sorption medium from exiting the extractor and therefore prevents downstream valves and the like from becoming clogged. In addition, the felt acts as a coarse particulate filter to extend the useful life of the downstream fine particulate filter typically used in oil recirculating systems.

Because of its inherent low resistance to liquid flow through it, the extractor is able to handle high viscosity oils very effectively. The bag does not permanently retain a high level of useable oil within the bag when the bag is replaced. It also reduces costs of disposal of the used extractor because the bag contains less oil after draining; used oil is classified as a hazardous material which requires specialized and costly handling. Smaller extractors containing less retained oil need to be disposed of less frequently. Further, the present extractor, when used substantially to its sorption capacity, includes very little void space and so need not be shredded, as is required for pleated filters for efficient disposal.

When used with water with and without oil dispersing additives within the oil, it has been found, using established ASTM testing procedures, that an extractor according to the present invention produces substantially lower residual water levels in lubricating oils than do previously known extraction devices. In tests using gear oil containing no water dispersal agent, an extractor according to the present invention extracted 1600 ml. (added to the oil periodically in 200 ml. increments) of water out of the oil and never went above 0.02% residual water with a flow rate of 1 gallon per minute. Furthermore, when tested with a sophisticated, high viscosity aircraft engine oil containing substantial levels of water dispersant additive, the extractor extracted 1200 ml of water (added to the oil in the same manner) and never went above 1% residual water with a flow rate of 1 gallon per minute; in that instance, the usual residual water level was 0.5% or lower.

The present extractor can be used on a large variety of lubricating oils. The present extractor operates on a higher viscosity oil than the prior art fiberglass laminate filter in which performance drops off as oil viscosity increases. For example, it has been found that the present extractor, unlike the prior art filters, can operate effectively on an oil with a kinematic viscosity greater than 350 Saybolt Seconds Universal.

The features and benefits reviewed above are provided in a low-cost extractor element which readily retrofits into existing canister assemblies commonly used in oil recirculating systems.

As noted above, the presently preferred sorption medium useful in the practice of the invention is Hoechst/Celanese polymer IM-1000 as converted into a tissue-faced laminated sheet material, product 9503, by Gelok International Corp. Polymer IM-1000 is a sodium polyacrylate polymer. A potassium polyacrylate polymer obtained from the same source has been found to be useful to extract water from oil, but not as effectively as the sodium salt of acrylic acid. Such polymers are referred to broadly as cornstarch grafted polyacrylates. To the extent that salts of acrylic acid, salts of other organic acids, and other substances are useful to extract one liquid from another, such organic acid salts and other substances can be used in extraction elements according to this invention to extract a variety of liquids from dispersion or suspension in other liquids.

The described embodiment of the invention is only preferred and illustrative of the inventive concept; the scope of the invention is not to be restricted to such an embodiment. Other arrangements may be devised by one skilled in the art without departing from the scope of the invention.

What is claimed is:

1. A water extraction element comprising:
    a bag permeable to a liquid containing water having a closed bottom and an open top;
    a bag support proximate the top of the bag; and
    a water-sorbing material essentially fully covering an inner surface of the bag, at least a portion of the water-sorbing material being present in the bag in filaments which are attached at upper ends thereof to the bag adjacent the bag support, which depend into the bag, and which are moveable relative to each other within the bag.

2. The apparatus of claim 1 in which the bag comprises a felt material folded and stitched into a bag-shape.

3. The apparatus of claim 2 in which at least one continuous layer of water-sorbing material lines an interior surface of the felt.

4. The apparatus of claim 1 in which the filaments of water-sorbing material are longer from their upper ends to their opposite ends than the length of the bag from the location of the filament upper ends to the bottom of the bag.

5. The apparatus of claim 1 in which the filaments of water-sorbing material are defined by a folded sheet of water-sorbing material having slits through the sheet between end margins of the sheet via which the sheet is attached to the bag.

6. The apparatus of claim 5 in which a plurality of slit and folded sheets of water-sorbing material are arranged in staggered layers within the bag.

7. The apparatus of claim 1 in which the bag support comprises a wire ring.

8. The apparatus of claim 1 in which at least one layer of water-sorbing material includes a superabsorbing polymer.

9. The apparatus of claim 8 wherein the polymer comprises a polyacrylate.

10. The apparatus of claim 9 wherein the polymer comprises a sodium polyacrylate polymer.

11. The apparatus of claim 8 in which the polymer is granular and forms an inner layer of a laminate which includes tissue sheets on opposite sides of that inner layer.

12. A method for extracting water from oil comprising the steps of:
    flowing wet oil having a dispersed water component into a porous container for passage of the oil from the interior of the container through the pores of the container to the exterior thereof;
    providing a water-from-oil sorber within the container in a form in which the sorber is carried in a slit sheet-like medium formed into a plurality of finger-like substantially physically separate flexible elements which are moveable bodily relative to each other within the container and which allow the sorber to expand substantially inwardly of the container toward the direction of oil flow; and
    flowing dry oil having a smaller water component relative to the wet oil out of the container.

13. The method of claim 12 in which the step of providing a water-from-oil sorber comprises providing a bag-type water-sorbing element in which the plurality of finger-like elements is contained within a bag comprised of a sheet of felt and at least one sheet of unslit sorber material.

14. A device for extracting water from dispersion in a non-aqueous liquid comprising:

a porous bag having a closed bottom, and an open top with which is associated a bag support, and a least one layer of water-sorbing material essentially fully covering the inner surface of the bag, at least a portion of that material being present in the bag as discrete bodies of the material which are free to move substantially bodily relative to each other and toward the interior of the bag in response to enlargement of the bodies due to sorbtion of water by the bodies.

15. A method of fabricating a device for extracting from a first liquid a second liquid dispersed in the first liquid, comprising the steps of:

providing at least one sheet of sorption material which includes a substance having the ability to extract the second liquid from dispersion in the first liquid;

slitting each sheet of sorption material to define a plurality of relatively moveable strips of the material which extend from at least one of two opposite end margins of the sheet;

providing a supporting bag having an open end and a closed end, which bag is formed of a material which is porous to the first liquid;

inserting each slit sheet of sorption material into the bag so that the strips extend into the bag around the interior thereof from adjacent the open end of the bag, and affixing to the bag adjacent the open end of the bag, as to each slit sheet, each sheet end margin from which extend strips formed in the sheet, the strips being free to move relative to each other within the bag.

16. The method of claim 15 in which the steps of providing a supporting bag includes providing in the bag, a lining comprised of at least one substantially continuous layer of said sorption material.

17. The method of claim 15 in which the slitting step comprises forming the strips along a central portion of the sheet between but not through the opposite end margins of the sheet, and including the further step of folding the sheet so that the end margins thereof are substantially registered, which further step is performed before performance of the inserting step.

18. The method of claim 15 including forming by slitting a plurality of sheets of sorption material and including the still further step of arranging the sheets in the bag in an overlying relation in which the end margins of the several sheets are substantially registered and in which adjacent sheets are offset along the margins of each sheet adjacent thereto so that the strips in each sheet cover the slits in each adjacent sheet.

19. The method of claim 18 including performing the arranging step before insertion of any sheet into the bag.

20. The method of claim 15 wherein the strips are defined to have effective lengths greater than the length of the bag from its open end to its closed end.

21. A device for extracting water from dispersion in a non-aqueous liquid comprising:

a porous bag having a closed bottom, an open top with which is associated a bag support, and at least one layer of water-sorbing material essentially fully covering the inner surface of the bag, at least a portion of that material being present in the bag as discrete bodies of the water-sorbing material, the water-sorbing material defining said bodies swelling in response to sorption of water by it, said bodies being free to move substantially bodily relative to each other and toward the interior of the bag in response to enlargement of the bodies due to sorption of water by the bodies.

22. A device according to claim 21 wherein the discrete bodies of the water-sorbing material are defined as strips of that material, which strips are secured at upper ends thereof to the bag and hang down into the bag from those ends.

23. A device according to claim 21 in which the water-sorbing material includes at least one substantially continuous layer thereof disposed substantially as a liner over the inner surface of the bag.

* * * * *